US009299098B2

(12) United States Patent
Raman et al.

(10) Patent No.: US 9,299,098 B2
(45) Date of Patent: Mar. 29, 2016

(54) SYSTEMS FOR GENERATING A GLOBAL PRODUCT TAXONOMY

(71) Applicant: eBay Inc., San Jose, CA (US)

(72) Inventors: Suresh Raman, Santa Clara, CA (US); Ming Liu, San Jose, CA (US)

(73) Assignee: eBay Inc., San Jose, CA (US)

( * ) Notice: Subject to any disclaimer, the term of this patent is extended or adjusted under 35 U.S.C. 154(b) by 192 days.

(21) Appl. No.: 13/966,144

(22) Filed: Aug. 13, 2013

(65) Prior Publication Data

US 2015/0052020 A1 Feb. 19, 2015

(51) Int. Cl.
  *G06F 17/30* (2006.01)
  *G06Q 30/06* (2012.01)
(52) U.S. Cl.
  CPC .................................. *G06Q 30/0627* (2013.01)
(58) Field of Classification Search
  CPC .............................................. G06F 17/30864
  See application file for complete search history.

(56) References Cited

U.S. PATENT DOCUMENTS

2009/0210315 A1\* 8/2009 Jean et al. ......................... 705/26
2014/0172652 A1\* 6/2014 Pobbathi et al. ................. 705/28

OTHER PUBLICATIONS

Yu et al. "Product Title Classification versus text classification", Dec. 8, 2012.\*

\* cited by examiner

*Primary Examiner* — Apu Mofiz
*Assistant Examiner* — Cindy Nguyen
(74) *Attorney, Agent, or Firm* — Schwegman Lundberg & Woessner, P.A.

(57) ABSTRACT

Techniques for generating a globally applicable taxonomy of e-commerce goods are described. According to various exemplary embodiments described herein, a taxonomy management system is configured to analyze item listing titles and user search queries in order to identify a set of globally applicable product types that serve as universal descriptors of the underlying things or objects that are the subject of an item listing or the likely user intended subject of a user search query. Such globally applicable product types are agnostic as to any specific product inventory or product category structure of an e-commerce website. After the taxonomy management system identifies product types, the taxonomy management system may incorporate the identified product types into a global product taxonomy that identifies the globally applicable product types.

17 Claims, 17 Drawing Sheets

| PRODUCT CATEGORY | ATTRIBUTES |
|---|---|
| Accessories | Brand<br>Model<br>Size<br>Material<br>Type<br>Brand<br>Color<br>... |
| Computer | CPU<br>Memory<br>Hard Disk Space<br>Display Size<br>Wi-fi capability<br>Graphics Processor<br>... |
| ... | ... |

*Fig. 5*

| PRODUCT CATEGORY | PRODUCT |
|---|---|
| C1 | P0<br>P1<br>P2<br>P3 |
| C2 | P4<br>P5<br>P6<br>P7 |
| C3 | P8<br>P9<br>P10<br>P11 |
| C4 | P12<br>P13<br>P14<br>P15 |
| ... | ... |

Fig. 9

SYSTEMS FOR GENERATING A GLOBAL PRODUCT TAXONOMY

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright eBay, Inc. 2013, All Rights Reserved.

TECHNICAL FIELD

The present application relates generally to data processing systems and, in one specific example, to techniques for generating a globally applicable taxonomy of e-commerce goods.

BACKGROUND

Conventional e-commerce websites allow shoppers to browse through a wide variety of items available for sale online. Each e-commerce website typically hosts multiple item listing webpages that offer various items for sale. Moreover, each e-commerce website generally maintains its own product inventory and its own product category structure.

BRIEF DESCRIPTION OF THE DRAWINGS

Some embodiments are illustrated by way of example and not limitation in the figures of the accompanying drawings in which:

FIG. 5 illustrates an example of information describing attributes associated with various product categories in a product category structure of an e-commerce website, according to various embodiments;

FIG. 9 illustrates an example of a product category structure of an e-commerce website, according to various embodiments;

DETAILED DESCRIPTION

Figure 1:
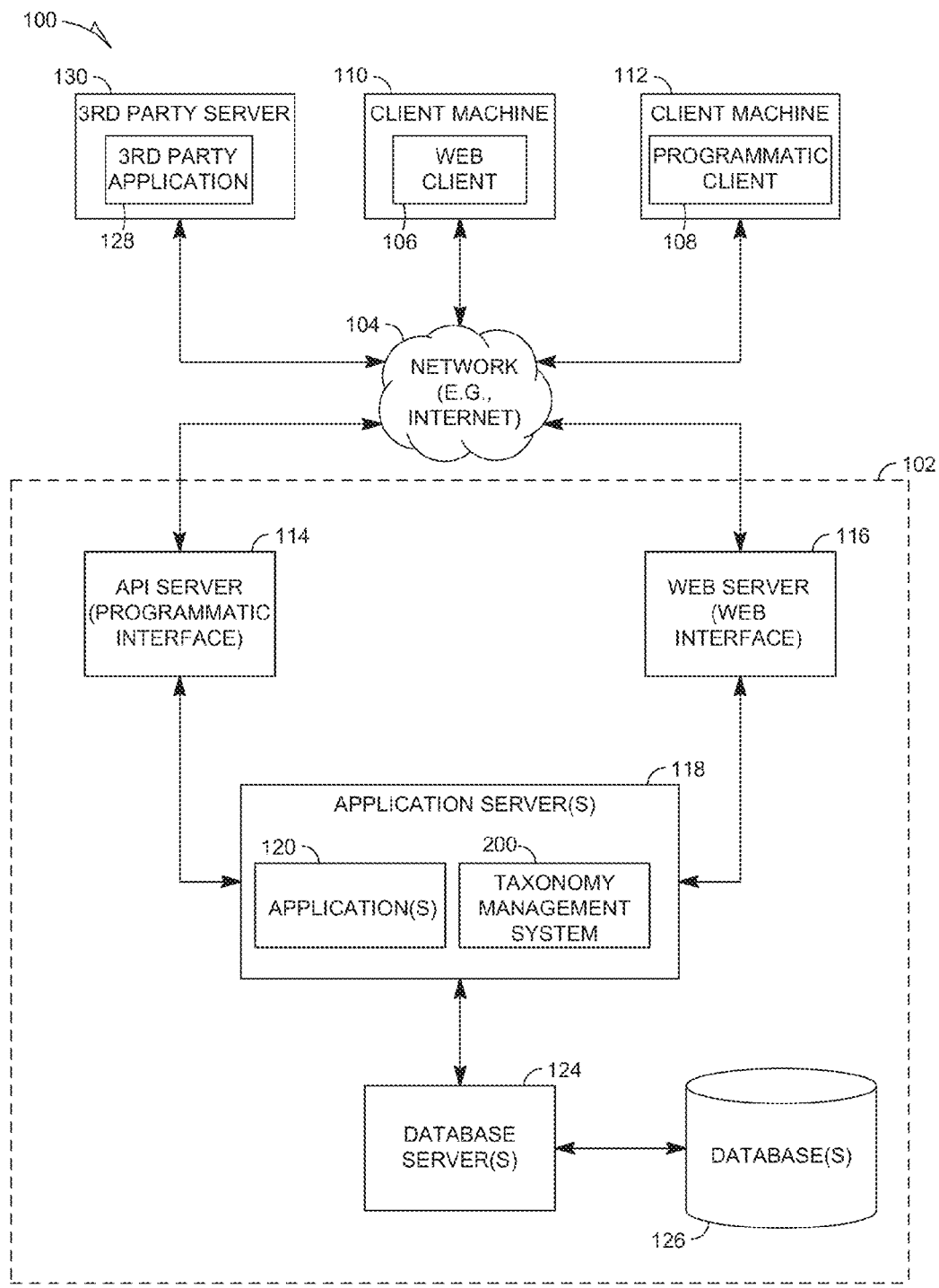
FIG. 1 is a network diagram depicting a client-server system, within which one example embodiment may be deployed.

Example methods and systems for generating a globally applicable taxonomy of e-commerce goods are described. In the following description, for purposes of explanation, numerous specific details are set forth in order to provide a thorough understanding of example embodiments. It will be evident, however, to one skilled in the art that the present invention may be practiced without these specific details.

According to various exemplary embodiments described herein, a system is configured to discover a globally applicable taxonomy of e-commerce goods, where the goods may include product items that may be offered for sale (e.g., on e-commerce websites such as ebay.com). As described herein, the globally applicable taxonomy (also referred to herein as a "global product taxonomy") may correspond to a hierarchical list in a data structure of various product types. For example, for any item that may be sold on an e-commerce website, there exists a corresponding "product type" in a globally applicable taxonomy, where the product type may correspond to a simple universal word used by humans to describe the thing being sold. Examples of product types include "shoe", "shirt", "clothes", "umbrella", "phone", "camera", and so on. Such product types may be distinct from the product categories in the existing product category structures associated with various e-commerce websites (such as eBay® and Amazon®), since such predefined category structures are tailored for a front-end facing consumer application. For example, the product category structure of the eBay® e-commerce website includes highly specific categories such as "boys clothes (newborns to 5T)", "girls clothes (newborns to 5T)", "unisex clothes (newborns to 5T)", and so on. These category structures are selected based on how efficiently and effectively they dissect the specific product inventory of a given e-commerce website, and based on how easy it is for a user to locate a specific product category, and so on. However, such distinct product categories are not universal, since different e-commerce websites with distinct product inventories will usually have an entirely different product category structure. Thus, the globally and universally applicable taxonomy of product types described herein may be agnostic as to any particular product inventory and product category structure of any particular e-commerce website.

In some embodiments, a system uses machine learning techniques to automatically generate dictionaries of product types and ultimately to generate the globally applicable taxonomy based on the product types that may be used to classify e-commerce goods. Thus, when the system receives a new listing, the system can classify the listing against the globally applicable taxonomy of product types. This may provide enormous benefits for a variety of downstream systems that rely on an understanding of what the item is.

In some embodiments, a system derives the various product types for the globally applicable taxonomy of e-commerce goods by analyzing user search queries and product item listing titles. Applicants have determined that user search queries and product item listing titles often contain the desired product type therein, although the product type is often combined with noise including other terms and tokens. For example, the user search query "large red umbrella" contains the word "umbrella", which is a candidate for a product type, as well as the tokens "large" and "red". The category structure of an e-commerce website (e.g., eBay.com) already includes dictionaries of qualifying name-value pairs corresponding to various product attributes (e.g., size, type, brand, color, etc.). Thus, when the system receives a new listing title or user search query, the system may tokenize the title of the listing, perform attribute extraction on each of the tokens in the listing title based on the dictionaries of qualifying name-value pairs (e.g., matches tokens with size, type, brand, color, etc.), and remove these tokens from consideration (e.g., "large" and "red"). Any tokens that cannot be identified (e.g., "umbrella") may be classified by the system as likely candidates for a product type in the globally applicable taxonomy.

FIG. 1 is a network diagram depicting a client-server system 100, within which one example embodiment may be deployed. A networked system 102 provides server-side functionality via a network 104 (e.g., the Internet or Wide Area Network (WAN)) to one or more clients. FIG. 1 illustrates, for example, a web client 106 (e.g., a browser), and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more applications 120. The application servers 118 are, in turn, shown to be coupled to one or more databases servers 124 that facilitate access to one or more databases 126. According to various exemplary embodiments, the applications 120 may be implemented on or executed by one or more of the modules of the taxonomy management system 200 illustrated in FIG. 2. While the applications 120 are shown in FIG. 1 to form part of the networked system 102, it will be appreciated that, in alternative embodiments, the applications 120 may form part of a service that is separate and distinct from the networked system 102. With some embodiments, the application servers 118 hosts what is referred to herein a taxonomy management system 200. The taxonomy management system 200 is described in more detail below in conjunction with FIG. 2.

Further, while the system 100 shown in FIG. 1 employs a client-server architecture, the present invention is of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the applications 120 via the programmatic interface provided by the API server 114.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more functions that are supported by the relevant applications of the networked system 102.

Figure 2:
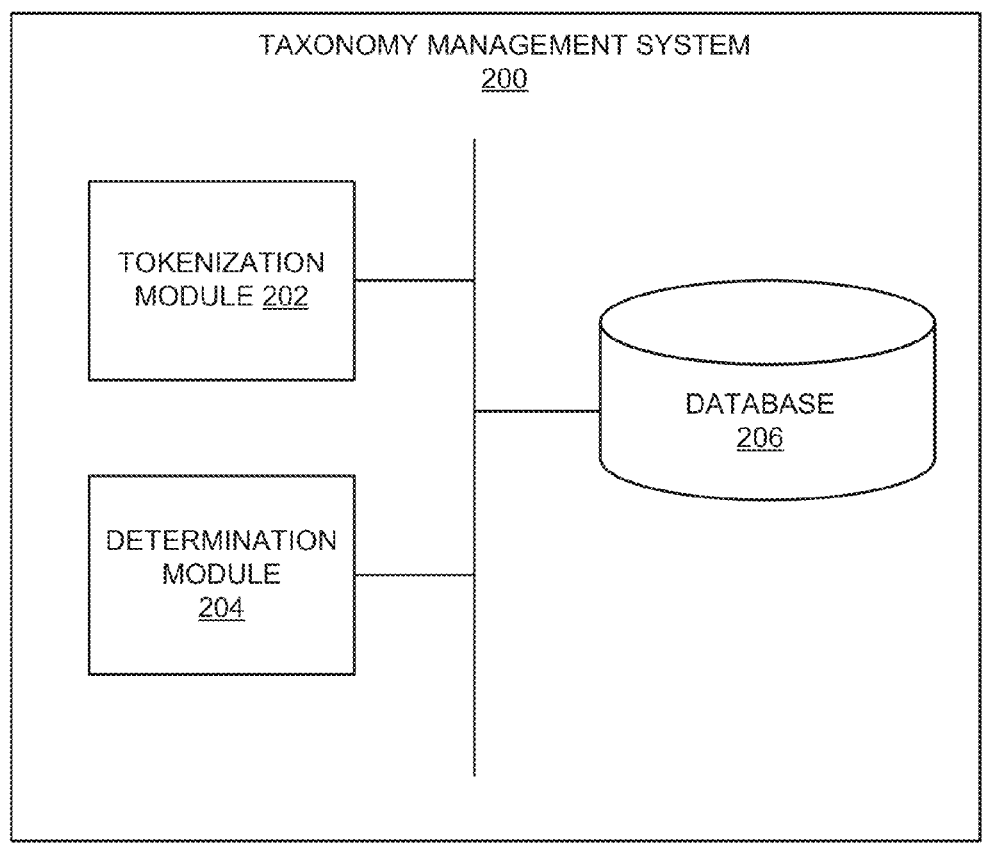
FIG. 2 is a block diagram of an example system, according to various embodiments.

Turning now to FIG. 2, a taxonomy management system 200 includes a tokenization module 202, a determination module 204, and a database 206. The modules of the taxonomy management system 200 may be implemented on or executed by a single device such as a taxonomy discovery device, or on separate devices interconnected via a network. The aforementioned taxonomy discovery device may be, for example, one of the client machines (e.g. 110, 112) or application server(s) 118 illustrated in FIG. 1.

According to various exemplary embodiments described herein, the taxonomy management system 200 is configured to analyze item listing titles and user search queries in order to identify a set of globally applicable product types that serve as universal descriptors of the underlying things or objects that are the subject of an item listing or the likely user intended subject of a user search query. Such globally applicable product types are agnostic as to any specific product inventory or product category structure of an e-commerce website. After the taxonomy management system 200 identifies product types, the taxonomy management system may incorporate the identified product types into a global product taxonomy that identifies the globally applicable product types.

For example, according to various exemplary embodiments described in greater detail below, the tokenization module 202 is configured to access an item listing title associated with an item listing of an e-commerce website or a user search query associated with an item search request submitted to the e-commerce website. The tokenization module 202 is then configured to convert words in the listing title or user search query to semantic tokens in a token symbol space, based on a tokenizing process. Thereafter, the determination module 204 is configured to determine that one or more of the tokens are attribute values associated with predefined attributes of one or more product categories in a product category structure of the e-commerce website. The determination module 204 is then configured to classify the remaining tokens as candidate product type tokens associated with a global product taxonomy.

Figure 3:
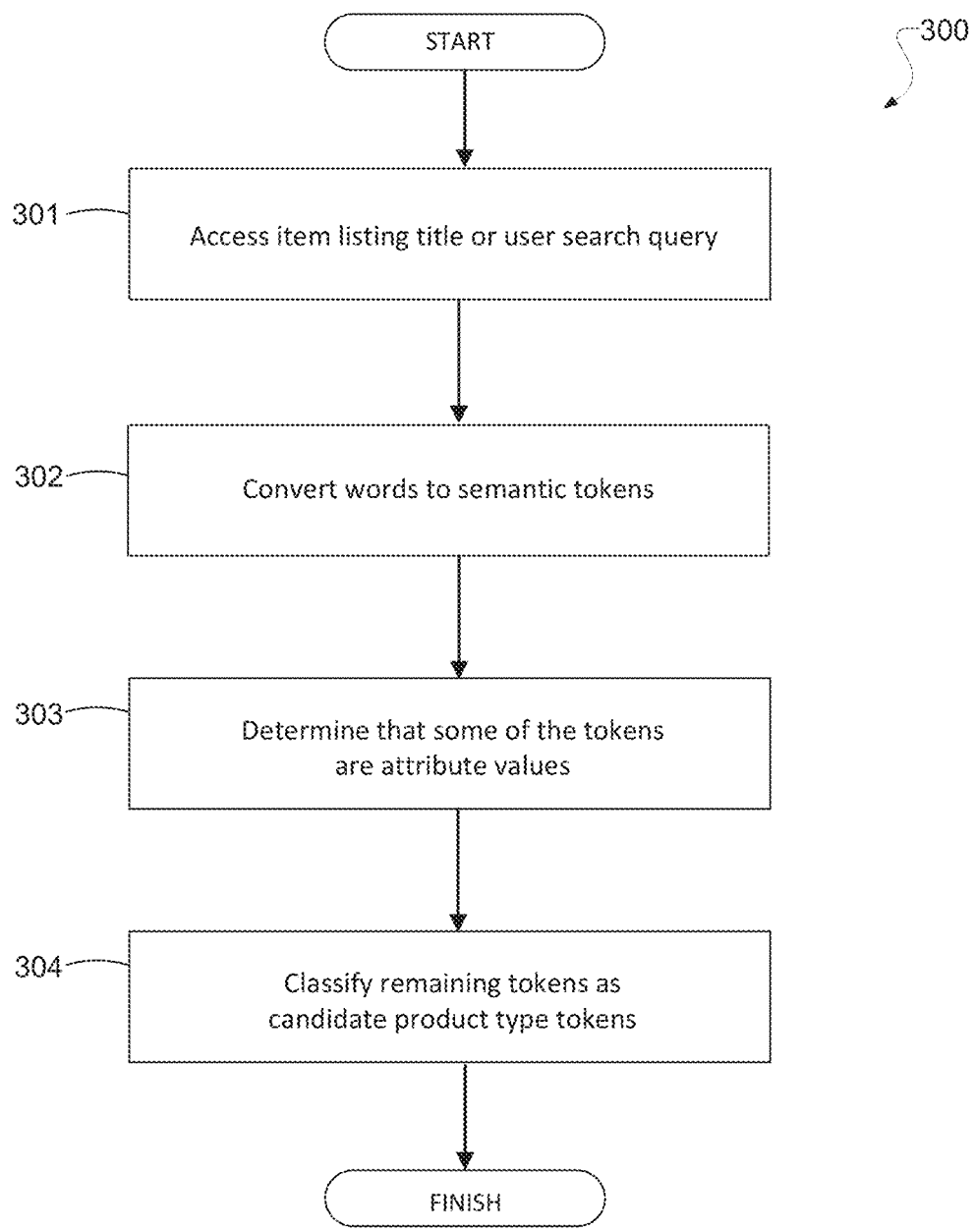
FIG. 3 is a flowchart illustrating an example method, according to various embodiments.
Figure 4:
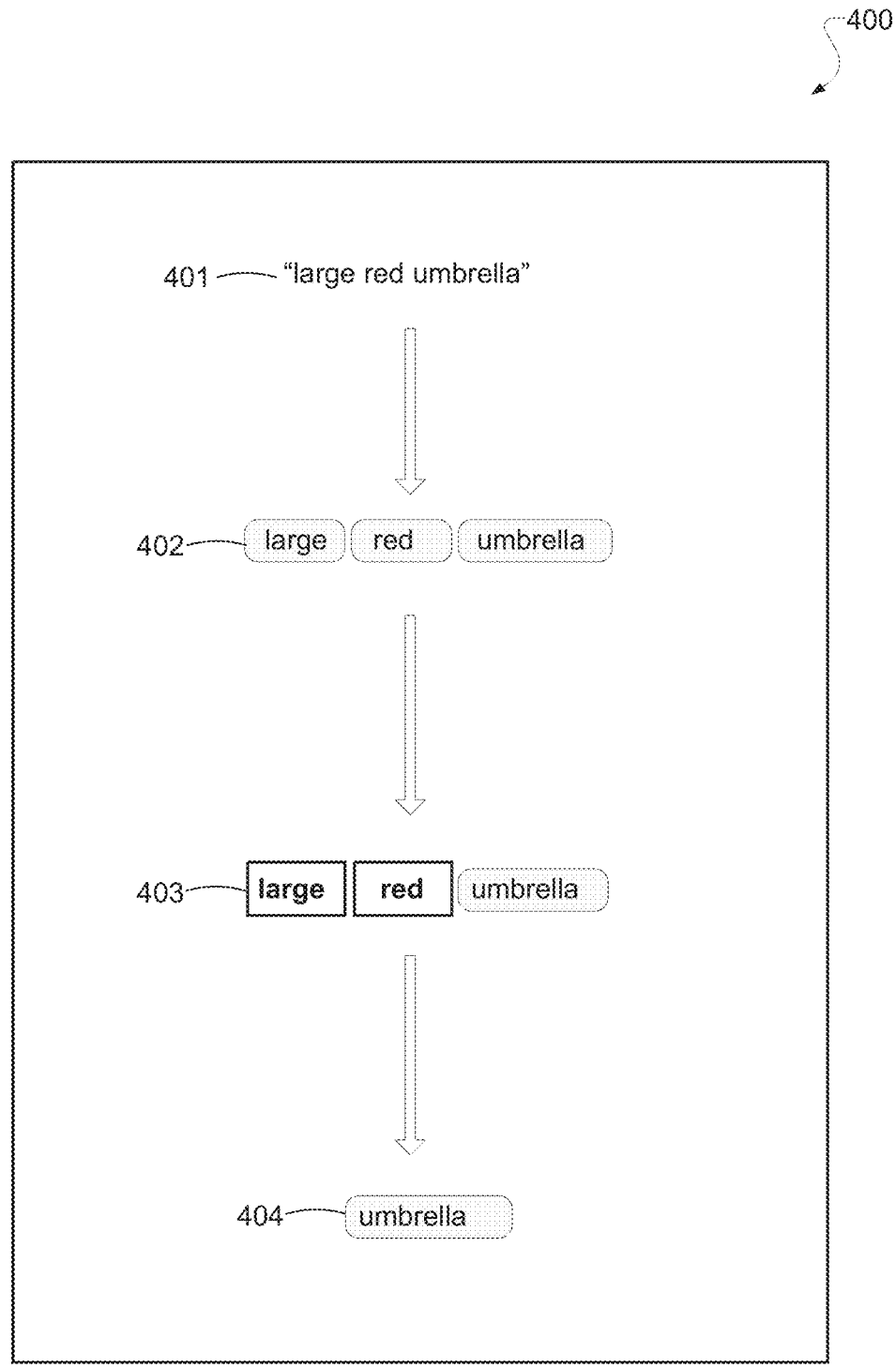
FIG. 4 illustrates an example of a technique for tokenizing an item listing title or a user search query, according to various embodiments.

FIG. 3 is a flowchart illustrating an example method 300, according to various exemplary embodiments. The method 300 may be performed at least in part by, for example, the taxonomy management system 200 illustrated in FIG. 2 (or an apparatus having similar modules, such as client machines 110 and 112 or application server 118 illustrated in FIG. 1). In operation 301, the tokenization module 202 accesses at least one of an item listing title and a user search query. For example, FIG. 4 illustrates an example of an input string "large red umbrella" (401) corresponding to an item listing title or a search query that is accessed by the tokenization module 202. In some embodiments, the input string may be an item listing title of an item listing that has already been posted or is currently posted on an e-commerce website. For example, such an item listing may describe and offer a particular item or product for sale, and thus the item listing title corresponds to the title of the item for sale. Alternatively, in some embodiments, the item listing title may be submitted by a seller in conjunction with a request to post an item listing or an item listing page on the e-commerce website. For example, the seller may access a user interface for allowing the seller to generate an item listing page, where the seller may specify the item listing title as well as other information (e.g., a description and an image of the item) via the user interface. In some embodiments, the input string may be a user search query submitted by a user who is requesting a search for products on an e-commerce website, based on the search query terms. For example, the user may submit the search query via a search query entry field in a search user interface of the e-commerce website.

In operation 302 in FIG. 3, the tokenization module 202 converts words in the listing title or user search query to semantic tokens in a token symbol space, based on a tokenizing process. For example, as illustrated in FIG. 4, the input string "large red umbrella" has been tokenized to produce the tokens "large", "red", and "umbrella" (402). In some embodiments, the tokenizing process may involve identifying different words in the string, and may also involve normalizing each of the words and/or replacing each of the words with a substitute value or "token" representing each word. Processes of tokenizing words in a string are well understood by those skilled in the arts of linguistics, lexical analysis, and natural language processing, and will not be described in further detail herein in order to avoid occluding various aspects of this disclosure.

In operation 303 in FIG. 3, the tokenization module 202 determines that one or more of the tokens are attribute values associated with predefined attributes of one or more product categories in a product category structure of the e-commerce website. For example, an e-commerce website will typically include a product inventory of various product items that may be offered for sale on the e-commerce website. Moreover, the category structure of an e-commerce website (e.g., eBay.com) will typically specify various product categories in the product inventory of the e-commerce website, as well as various possible attributes and attribute values for each of the categories. For example, FIG. 5 illustrates an example of product category information 500 associated with product category structure of an e-commerce website. The product information 500 identifies various product categories (e.g., accessories, computers, etc.) and, for each of the product categories, a number of attributes, such as the attributes "brand", "model" and "size" associated with the product category of "accessories".

Although not shown in FIG. 5, the product category information 500 may also include dictionaries of qualifying attribute-value pairs corresponding to various product attributes (e.g., size, type, brand, color, etc.). For example, the product category information 500 may indicate that, for the attribute of brand, the various possible values that this attribute may take are "Gucci", "Chanel", etc., while for the attribute of size, the various possible values that this attribute may take include "small", "medium", "large", etc., while for the attribute of color, the various possible values that this attribute may take include "red", "blue", "green", etc., and so on for each of the attributes for each product category.

Accordingly, the determination module 204 may perform an attribute extraction process on the input string to determine if any of the tokens therein correspond to attribute values in attribute-value pairs. For example, as illustrated in FIG. 4, the determination module 204 may determine that the tokens of "large" and "red" (403) correspond to attribute values for the attributes "size" and "color" in one or more produce categories (e.g., the product category of "accessories" as illustrated in FIG. 5). In other words, the determination module 204 may determine that the token "large" may correspond to the known attribute-value pair of "size:large", while the token "red" may correspond to the known attribute-value pair of "color:red". The determination module 204 may then remove these tokens "large" and "red" from consideration as candidates for product types in the global product taxonomy. As described in more detail below, any tokens remaining that cannot be identified (e.g., "umbrella") may be likely candidates for a product type in the globally applicable taxonomy.

Referring back to the method 300 in FIG. 3, in operation 304, the determination module 204 classifies remaining ones of the tokens as candidate product type tokens associated with the global product taxonomy. In other words, any remaining tokens in the input string that cannot be designated as attribute values may be classified as candidate product type tokens. For example, as illustrated in FIG. 4, the tokens "large" and "red" are determined to be attribute values for the attributes "size" and "color", whereas the token of "umbrella" does not correspond to an attribute value. Accordingly, the determination module 204 will classify the token "umbrella" as a candidate for a product type in the global product taxonomy.

Figure 6A:
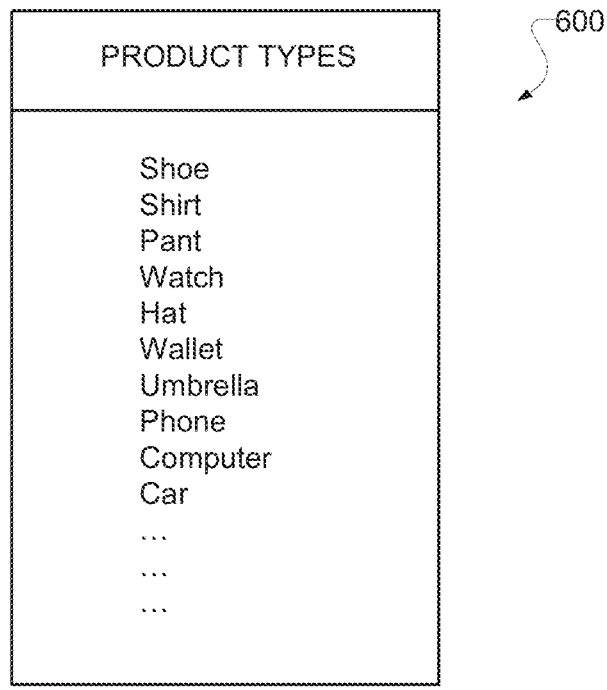
FIG. 6A illustrates an example of various product types in a global product taxonomy, according to various embodiments.
Figure 6B:
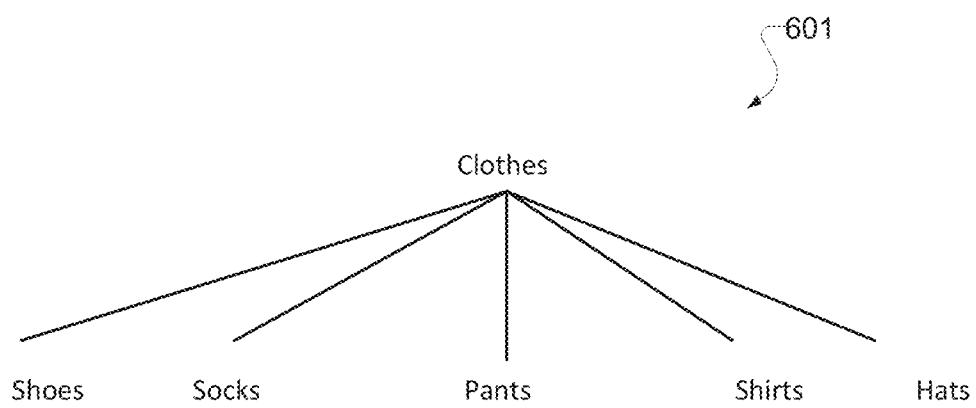
FIG. 6B illustrates an example of various product types in a global product taxonomy, according to various embodiments.

In some embodiments, if there is only one candidate product type token remaining after the method 300 is performed, then this candidate product type token may automatically be considered a bona fide product type, and the product type may be automatically incorporated into the global product taxonomy. For example, FIG. 6A illustrates an example of a data structure or data table storing the global product taxonomy 600 including various product types, such as "shoe", "shirt", "pant", and so on. As illustrated in FIG. 6A, the global product taxonomy now also includes the product type of "umbrella", corresponding to the candidate product type token identified in FIG. 4. While FIG. 6A illustrates the global product taxonomy in the form of a list, it is understood that the global product taxonomy may correspond to a hierarchical tree structure, with parent products types and child products types associated with parent product types, such as global product taxonomy 601 as illustrated in FIG. 6B. The global product taxonomy 600 or 601 may be stored locally at, for example, the database 206 illustrated in FIG. 2, or may be stored remotely at a database, data repository, storage server, etc., that is accessible by the taxonomy management system 200 via a network (e.g., the Internet).

Figure 7:
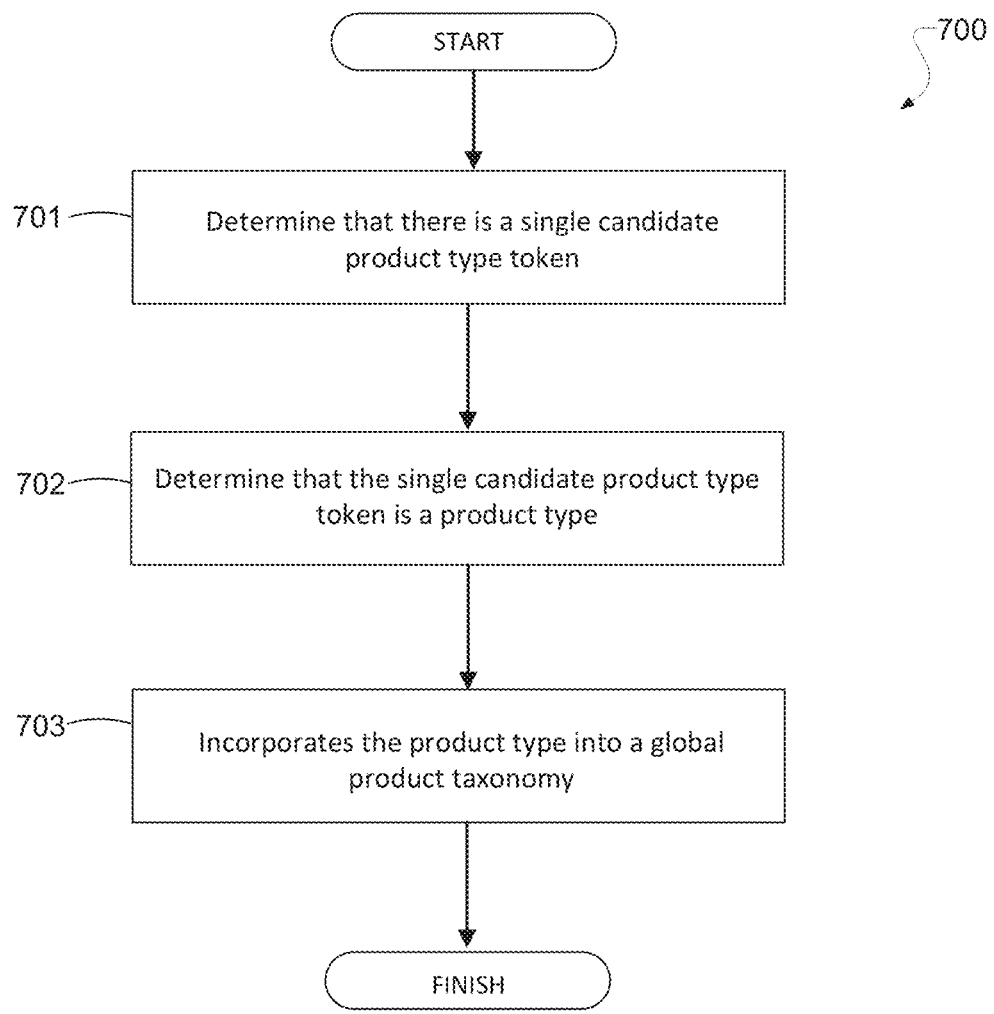
FIG. 7 is a flowchart illustrating an example method, according to various embodiments.

FIG. 7 is a flowchart illustrating an example method 700, consistent with various embodiments described above. The method 700 may be performed at least in part by, for example, the taxonomy management system 200 illustrated in FIG. 2 (or an apparatus having similar modules, such as client machines 110 and 112 or application server 118 illustrated in FIG. 1). The method 700 may be performed after the method 300. In operation 701, the determination module 204 determines only a single candidate product type token remains (after the method 300 is performed). In operation 702, the determination module 204 determines that the single candidate product type token is a product type in the global product taxonomy. In operation 703, the determination module 204 incorporates the product type into the global product taxonomy.

In some embodiments, the determination module 204 may display the candidate product type token in a user interface for human review, where the user may specify that the candidate product type token is or is not a product type in the global product taxonomy. If the user specifies via the user interface that the candidate product type token (e.g., umbrella) is indeed a product type in the global product taxonomy, then this product type may be incorporated into the global product taxonomy.

Figure 8:
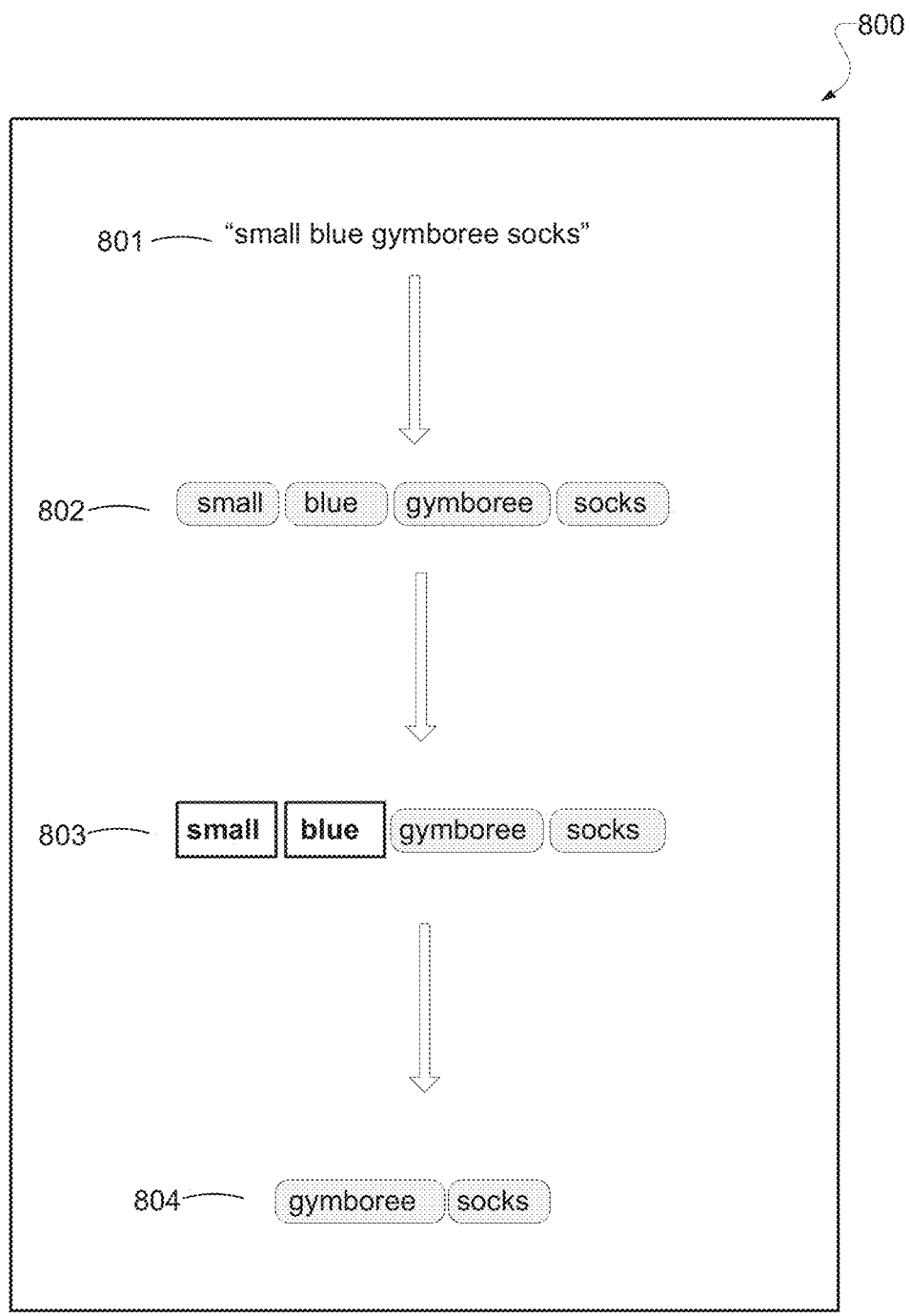
FIG. 8 illustrates an example of a technique for tokenizing an item listing title or a user search query, according to various embodiments.

According to various exemplary embodiments, after performing the method 300, it is possible that the determination module 204 may identify multiple candidate product type tokens. For example, FIG. 8 illustrates an example of a flow in accordance with the method 300 in which an input string "small blue gymboree socks" is received by the tokenization module 202 (see 801), the input string is tokenized into the semantic tokens "small", "blue", "gymboree" and "socks" by the tokenization module 202 (see 802), the tokens "small" and "blue" are identified as attribute values by the determination module 204 (see 803), and the remaining tokens "gymboree" and "socks" are classified by the determination module 204 as candidate product type tokens (see 804). In some embodiments, if there are multiple candidate product type tokens detected after the method 300, the determination module 204 may display these candidate product type tokens in a user interface for human review, where a user may specify which ones of the candidate product type tokens are product types in the global product taxonomy. If the user specifies via the user interface that a particular candidate product type token (e.g., socks) is indeed a product type in the global product taxonomy, then this product type may be incorporated into the global product taxonomy.

According to various exemplary embodiments, if there are multiple candidate product type tokens detected after the method 300, the determination module 204 may filter the candidate product type tokens. For example, applicants have determined that candidate product type tokens may be filtered by measuring how prominently the candidate product type tokens appear in item titles in different product categories in a product category structure of an e-commerce website. More specifically, applicants have determined that bona fide product types in the global product taxonomy (e.g., "socks" in the example in FIG. 8) tend to appear prominently in very few product categories in a product category structure (such as leaf categories in a product category structure), whereas tokens that appear prominently in a large number of product categories or leaf categories in a product category structure tend not to be product types in the global product taxonomy (e.g., "gymboree" in the example in FIG. 8). In other words, the token "socks" appears prominently in the item names of only a few product categories or leaf categories, whereas the word "gymboree" appears prominently in the item names of a large number of product categories or leaf categories, indicating to the taxonomy management system 200 that "socks" is a product type in the global product taxonomy, whereas "Gymboree" is not.

For example, FIG. 9 illustrates an example of a conventional product category structure of an e-commerce website that identifies various product categories (e.g., C1-C4, etc.) and, for each of the product categories, the items therein (e.g., P0-P15, etc.). If the determination module 204 determines that the token "socks" appears prominently in the item names of only a few of the product categories C1-C4, etc. (e.g., if "socks" appears prominently in the names of the items P0-P3, but does not appear prominently in the names of the items P4-P7, or items P8-P11, or items P12-P115, etc.), then the determination module 204 may determine that "socks" is a product type in the global product taxonomy. On the other hand, if the determination module 204 determines that the token "gymboree" appears prominently in the item names of many of the product categories C1-C4, etc. (e.g., if "gymboree" appears prominently in the names of the items P0-P3, and items P4-P7, and items P8-P11, and items P12-P115, etc.), then the determination module 204 may determine that "gymboree" is not product type in the global product taxonomy.

Figure 10:
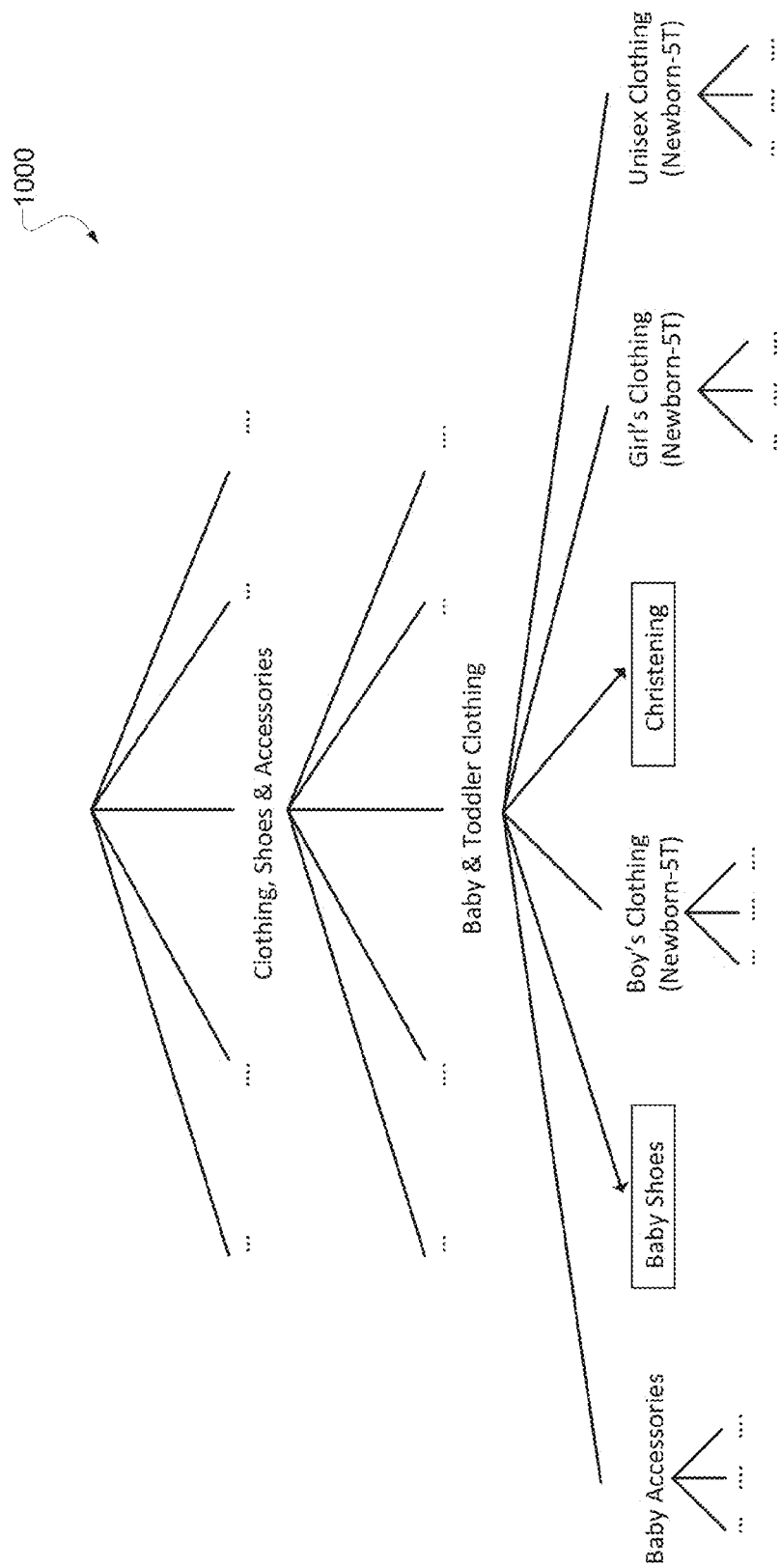
FIG. 10 illustrates an example of a product category structure of an e-commerce website, according to various embodiments.

While FIG. 9 illustrates a product category structure in the form of a list, the product category structure may be in the form of a hierarchical tree structure, with parent categories, child categories, leaf categories, and so on. In such case, the determination module 204 may determine whether the candidate product type tokens appear prominently in item names in the various leaf categories of the product category structure. As described herein, a leaf category refers to the most junior child category in branch of a hierarchical tree structure, such that no other categories extend from the leaf category and only items are included within the leaf category. Put another way, if an item's location in the hierarchical product category structure is A>B>C>D, then D is the child category. For example, FIG. 10 illustrates another example of a product category structure 1000 of an e-commerce website in the form of a hierarchical tree structure, where the leaf categories are the categories "baby shoes" and "christening".

Figure 11:
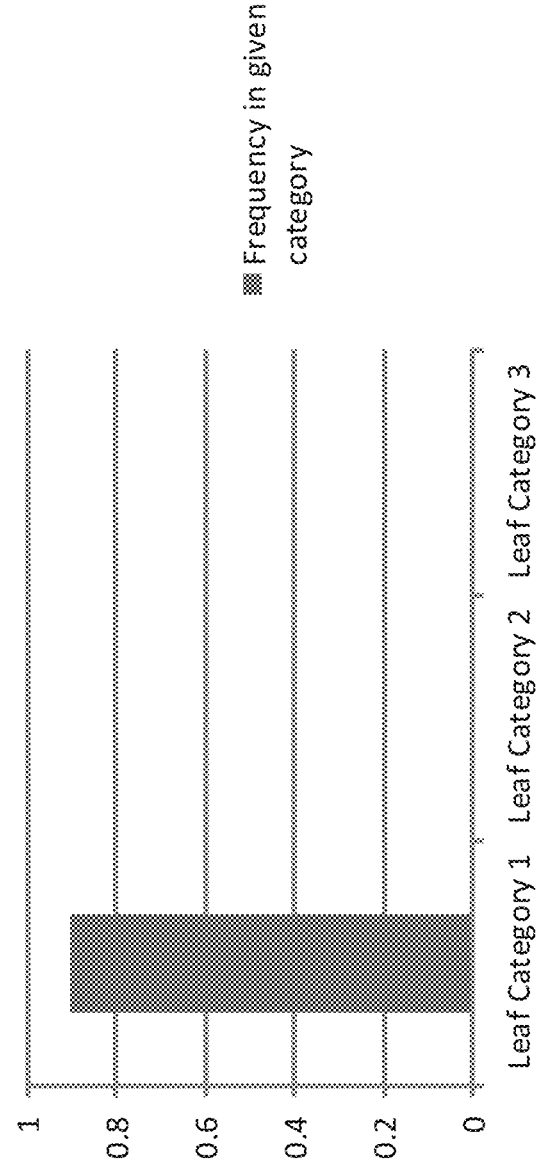
FIG. 11 illustrates an example of a histogram displaying how prominently a token appears throughout item titles in various leaf categories, according to various embodiments.
Figure 12:
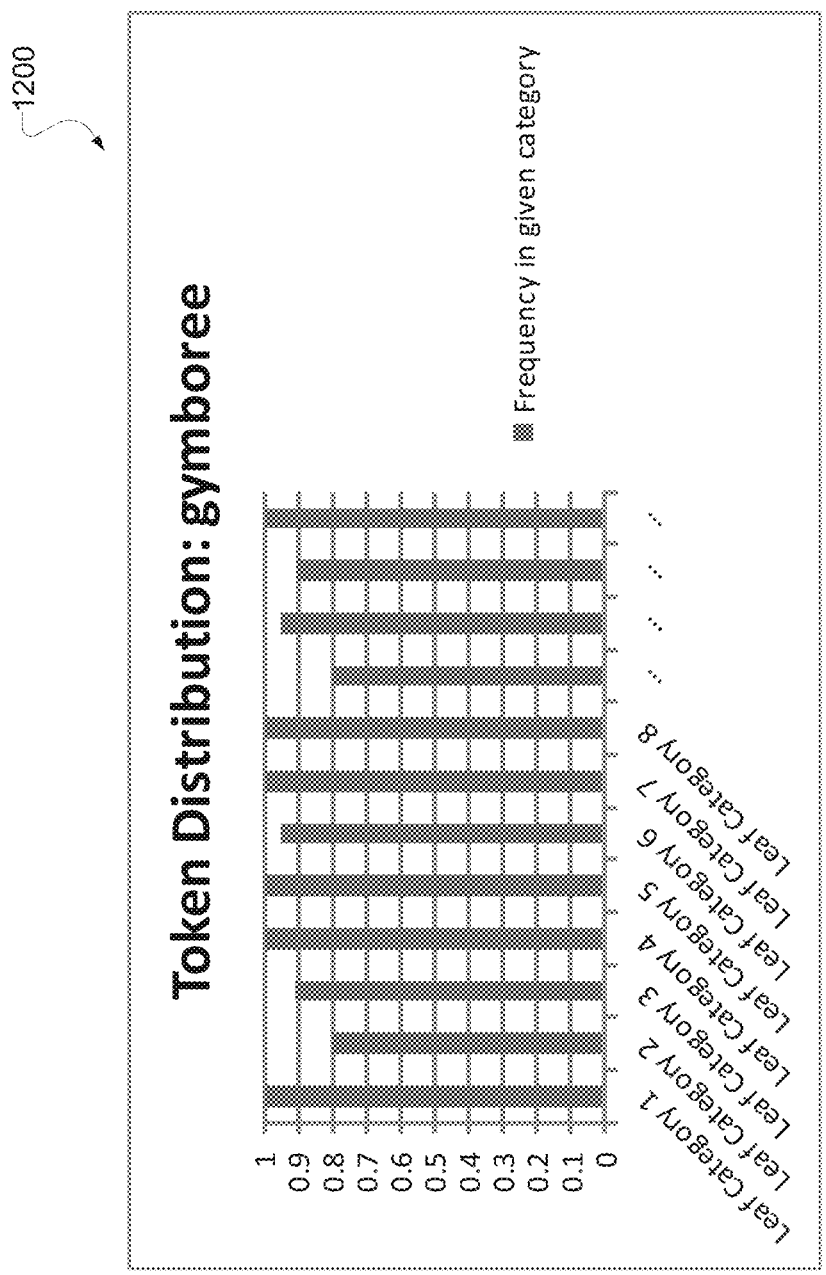
FIG. 12 illustrates an example of a histogram displaying how prominently a token appears throughout item titles in various leaf categories, according to various embodiments.

As described in more detail below, the determination module 204 may measure how prominently the candidate product type tokens appear in item titles in different product categories, by first identifying the most frequent terms in the item names in each of the different product categories or leaf categories. The determination module 204 may use various known statistical processes for determining the most frequent terms in each product category or leaf category, such as identifying all terms appearing in more than a threshold percentage of item names in a given category (e.g., all terms appearing in more than 50% of item names in a given category). Secondly, after the most frequent terms for each category are determined, the determination module 204 measures the entropy of the candidate product type tokens with respect to the most frequent terms for each of the categories, and the determination module 204 may identify the candidate product type token with the lowest entropy value. As understood by those skilled in the art, entropy is a statistical measure of "randomness" or "uncertainty" in a variable. In other words, the determination module 204 determines how many categories there are in which a given candidate product type token happens to be one of the most frequent terms in that category. For example, FIG. 11 illustrates a histogram 1100 showing that the token "socks" appears prominently (e.g., is one of the most frequent terms) in only a single leaf category (leaf category 1), and thus the token "socks" has a low entropy value, with respect to item names in product categories. On the other hand, FIG. 12 illustrates a histogram 1200 showing that the token "Gymboree" appears prominently (e.g., is one of the most frequent terms) in multiple leaf categories, and thus the token "gymboree" has a high entropy value, with respect to item names in product categories. Accordingly, based on such an analysis, the determination module 204 may determine that the token "socks" is a product type in the global product taxonomy.

Figure 13:
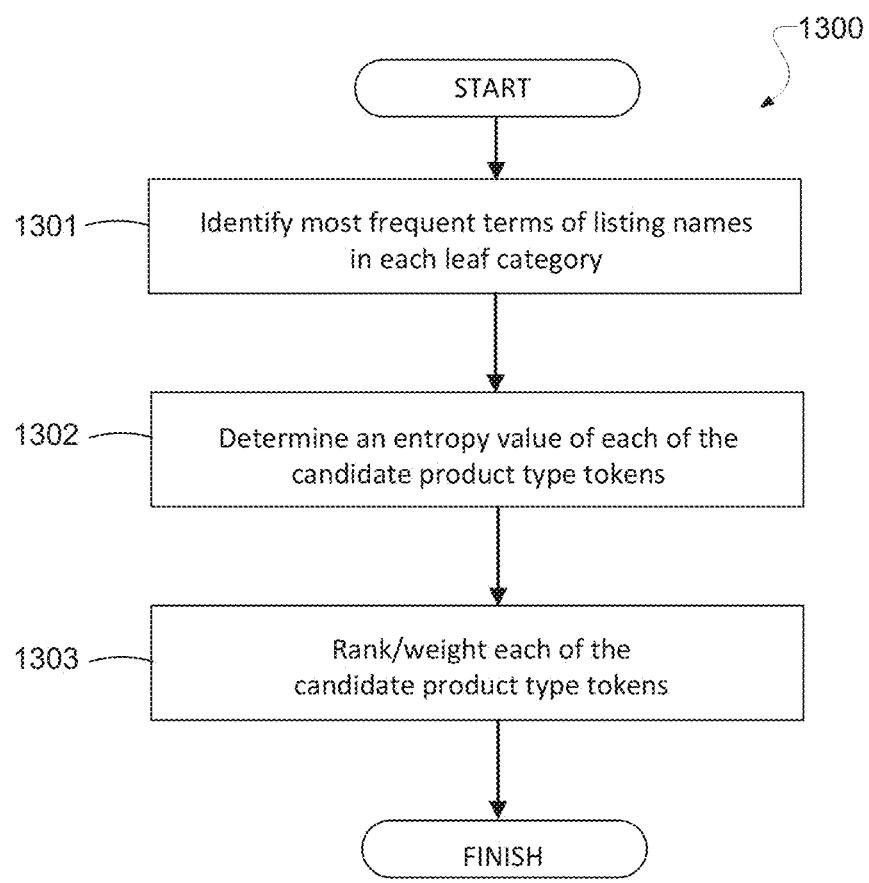
FIG. 13 is a flowchart illustrating an example method, according to various embodiments.

FIG. 13 is a flowchart illustrating an example method 1300, consistent with various embodiments described above. The method 1300 may be performed at least in part by, for example, the taxonomy management system 200 illustrated in FIG. 2 (or an apparatus having similar modules, such as client machines 110 and 112 or application server 118 illustrated in FIG. 1). The method 1300 may be performed after the method 300. In operation 1301, the determination module 204 identifies frequent terms in leaf categories associated with the product category structure of the e-commerce website. In operation 1302, the determination module 204 determines an entropy value of each of the candidate product type tokens based on the frequent terms in the leaf categories. In operation 1303, the determination module 204 ranks each of the candidate product type tokens, based on the entropy value associated with each of the candidate product type tokens. In some embodiments, the candidate product type tokens having a smaller entropy value are ranked higher than product type tokens having a greater entropy value. Alternatively, instead of ranking the candidate product type tokens in operation 1303, the determination module 204 may assign weights to the candidate product type tokens in proportion to their entropy values.

In some embodiments, after the candidate product type tokens are ranked, the determination module 204 may select one or more of the highest ranked candidate product type tokens and present them to a user for review. For example, the determination module 204 may select all the candidate product type tokens having at least a predetermined ranking (e.g., the top 1, 2, or 3 ranked candidate product type tokens). Alternatively, if the candidate product type tokens are weighted, the determination module 204 may perform a statistical analysis of the weights in order to select a group of candidate product type tokens having statistically significant low weightings. The group of candidate product type tokens may then be presented to a user for review, or may be automatically classified as product types and incorporated into the global product taxonomy.

Figure 14:
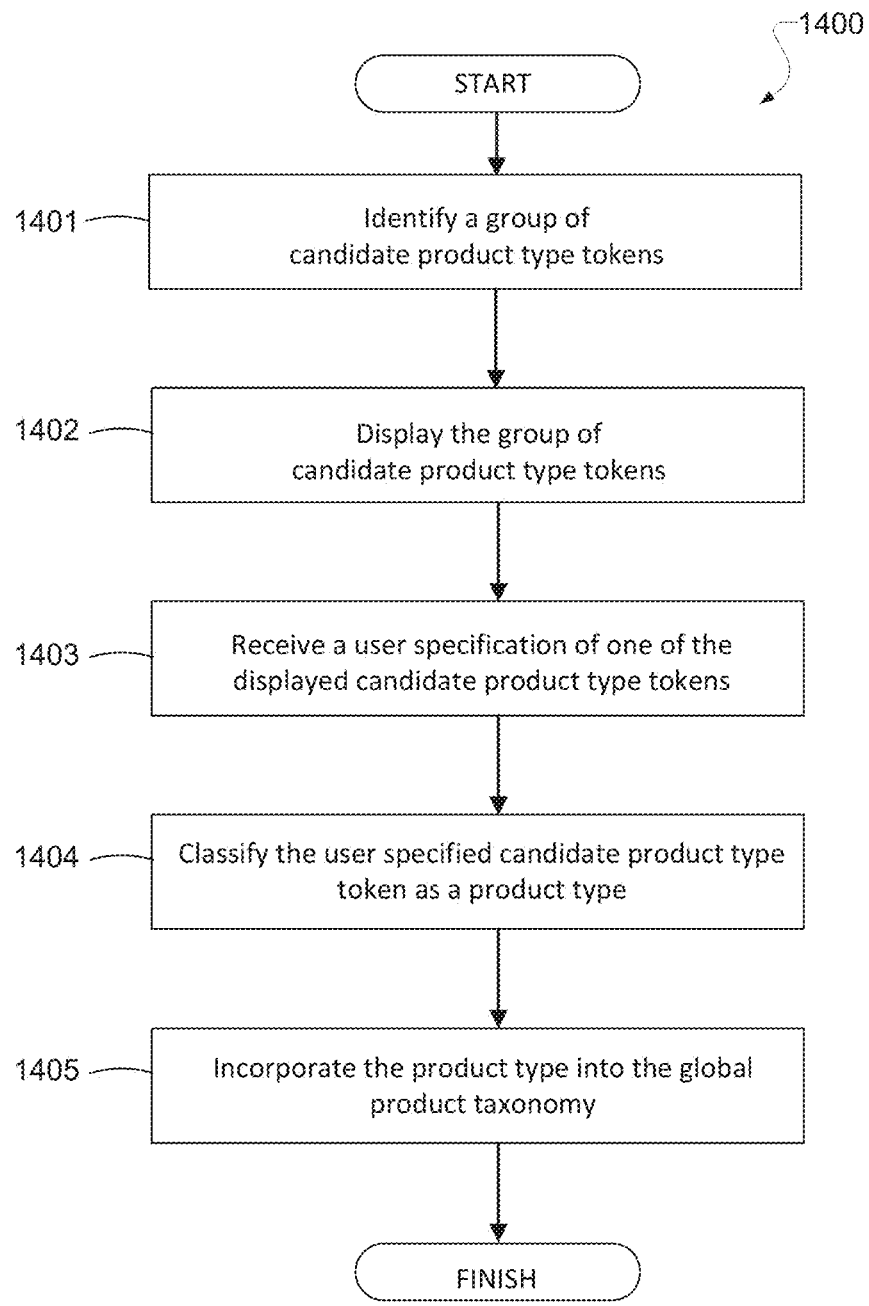
FIG. 14 is a flowchart illustrating an example method, according to various embodiments.

FIG. 14 is a flowchart illustrating an example method 1400, consistent with various embodiments described above. The method 1400 may be performed at least in part by, for example, the taxonomy management system 200 illustrated in FIG. 2 (or an apparatus having similar modules, such as client machines 110 and 112 or application server 118 illustrated in FIG. 1). In operation 1401, the determination module 204 identifies a group of the highest ranked or lowest weighted candidate product type tokens. In operation 1402, the determination module 204 displays, via a user interface, the group of candidate product type tokens. In operation 1403, the determination module 204 receives, via the user interface, a user specification of one or more of the displayed candidate product type tokens. In operation 1404, the determination module 204 classifies the user specified candidate product type tokens as product types in the global product taxonomy. In operation 1405, the determination module 204 incorporates the product type tokens into the global product taxonomy.

According to various exemplary embodiments, the taxonomy management system 200 may perform the techniques described in various embodiments on all or many of the item listing titles available on one or more e-commerce websites in order to incorporate as many product types as possible into the global product taxonomy. Similarly, the taxonomy management system 200 may revise the global product taxonomy accordingly as new item listing titles are added by sellers. Likewise, the taxonomy management system 200 may repeat the method 300 on all user search queries submitted by users to e-commerce websites, in order to supplement the global product taxonomy.

According to various exemplary embodiments, the determination module 204 may generate and maintain mapping information that maps the product types in the global product taxonomy to various product categories or leaf categories in the existing product category structure of an e-commerce website. For example, the mapping information may indicate that Product Type 1 corresponds to leaf categories 4, 7, and 11 in the existing product category structure of an e-commerce website, whereas Product Type 2 corresponds to leaf categories 2, 19, and 54 in the existing product category structure of the e-commerce website, and so on. In some embodiments, the determination module 204 may generate the mapping information by identifying all the leaf categories where a given product type name is one of the most frequent item names in that leaf category (using the techniques described in various embodiments above), and then the given product type is mapped to those leaf categories.

Accordingly, when a new item listing title is submitted by a seller in connection with a request to upload a new item listing, the determination module 204 may determine the product type associated with the item listing title using the techniques described herein, and then the determination module 204 may use the mapping information to identify the leaf categories associated with this product type. The leaf categories can then be supplied back to the seller as options for the categories with which the new item listing should be associated with. In some embodiments, these leaf categories may be compared with a category supplied by the seller, in order to determine if the seller has miscategorised the item listing.

Figure 15:
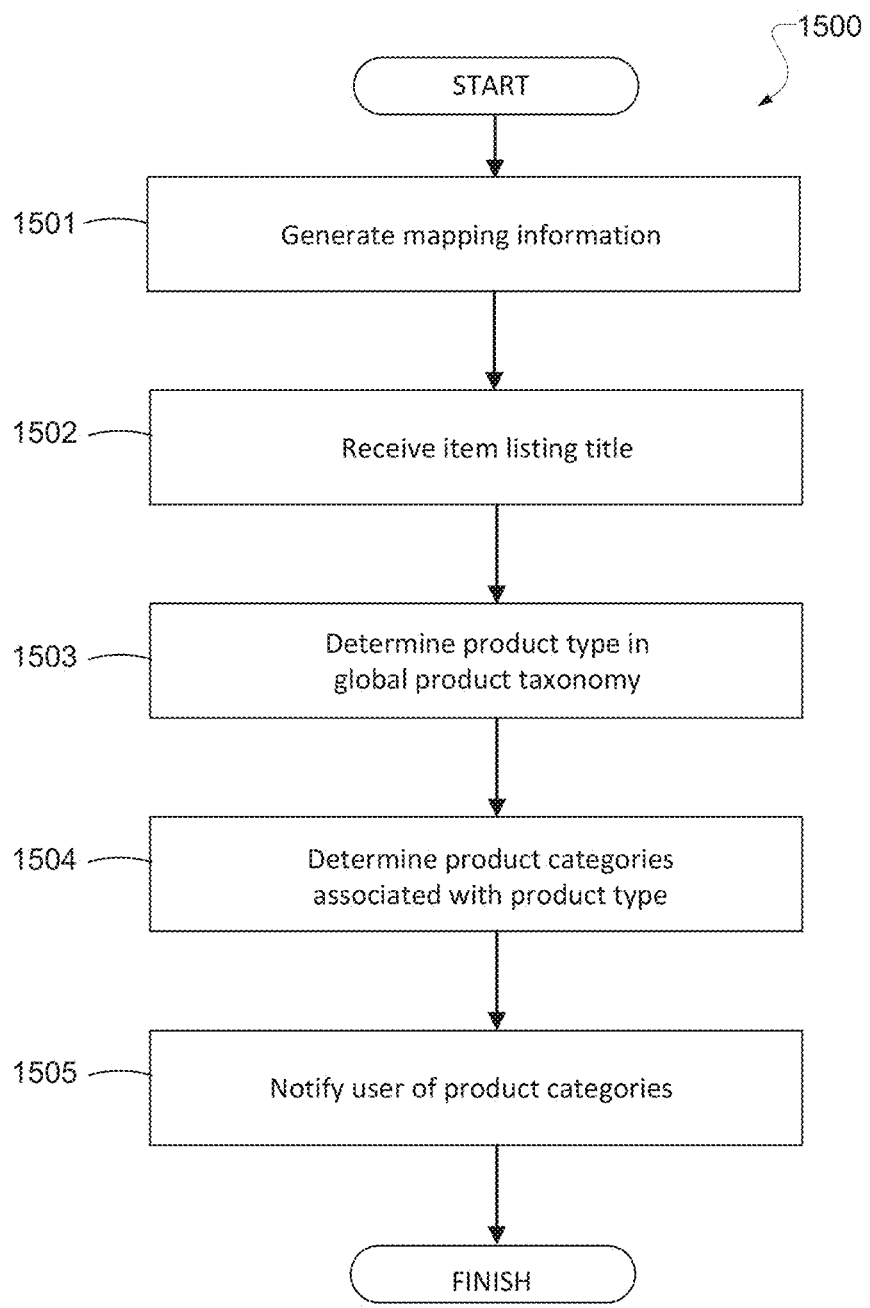
FIG. 15 is a flowchart illustrating an example method, according to various embodiments.

FIG. 15 is a flowchart illustrating an example method 1500, consistent with various embodiments described above. The method 1500 may be performed at least in part by, for example, the taxonomy management system 200 illustrated in FIG. 2 (or an apparatus having similar modules, such as client machines 110 and 112 or application server 118 illustrated in FIG. 1). In operation 1501, the determination module 204 generates mapping information mapping product types in the global product taxonomy to product categories in the existing product category structure of an e-commerce website. In operation 1502, the determination module 204 receives, via a user interface, an item listing title in connection with a user request to post an item listing on the e-commerce website. In operation 1503, the determination module 204 determines a product type in the global product taxonomy, based on the received item listing title. In operation 1504, the determination module 204 determines, based on the mapping information, one or more product categories in the product category structure of the e-commerce website associated with the product type determined in operation 1503. In operation 1505, the determination module 204 notifies the user that the item listing title may be or is associated with the product categories determined in operation 1504.

Example Mobile Device

Figure 16:
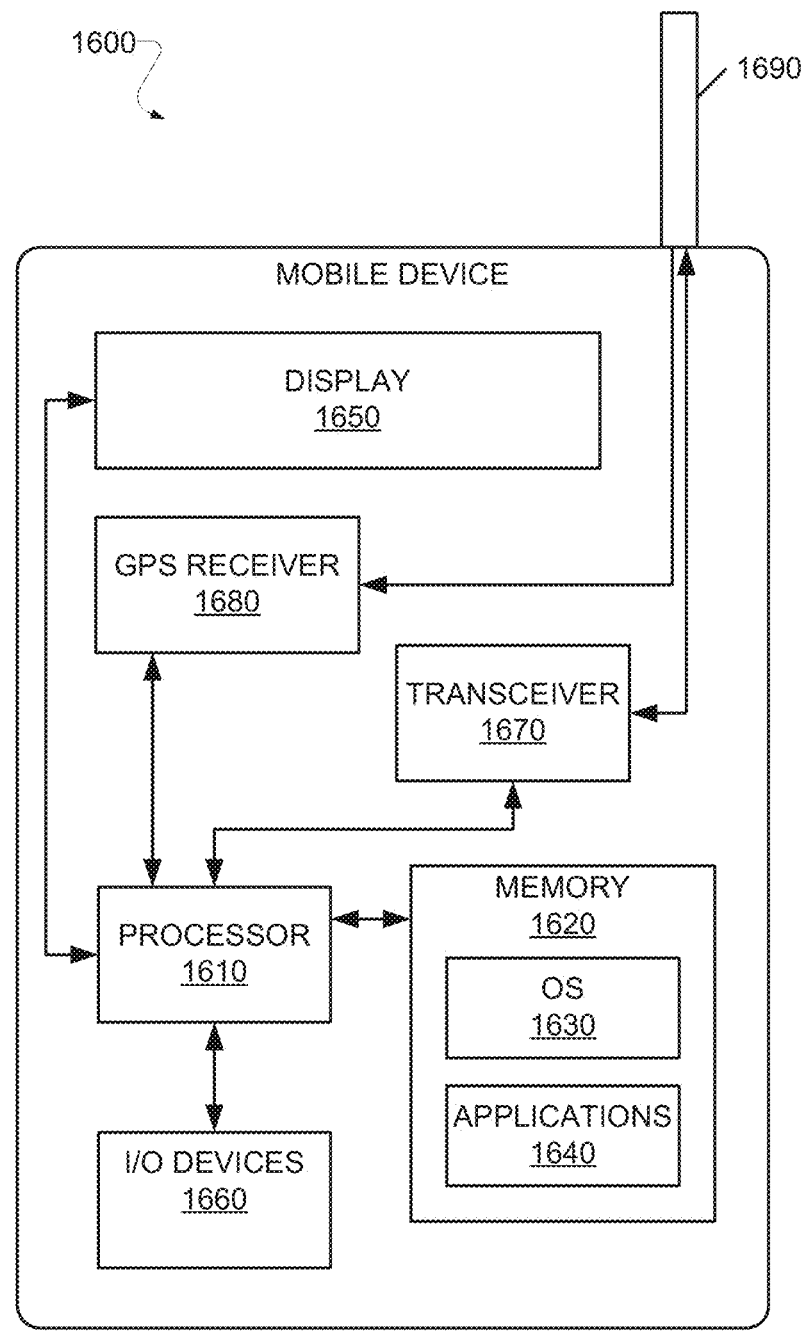
FIG. 16 illustrates an exemplary mobile device, according to various embodiments.

FIG. 16 is a block diagram illustrating the mobile device 1600, according to an example embodiment. The mobile device may correspond to, for example, client machines 110 and 112 or application server 118 illustrated in FIG. 1. One or more of the modules of the system 200 illustrated in FIG. 2 may be implemented on or executed by the mobile device 1600. The mobile device 1600 may include a processor 1610. The processor 1610 may be any of a variety of different types of commercially available processors suitable for mobile devices (for example, an XScale architecture microprocessor, a Microprocessor without Interlocked Pipeline Stages (MIPS) architecture processor, or another type of processor). A memory 1620, such as a Random Access Memory (RAM), a Flash memory, or other type of memory, is typically accessible to the processor 1610. The memory 1620 may be adapted to store an operating system (OS) 1630, as well as application programs 1640, such as a mobile location enabled application that may provide location based services to a user. The processor 1610 may be coupled, either directly or via appropriate intermediary hardware, to a display 1650 and to one or more input/output (I/O) devices 1660, such as a keypad, a touch panel sensor, a microphone, and the like. Similarly, in some embodiments, the processor 1610 may be coupled to a transceiver 1670 that interfaces with an antenna 1690. The transceiver 1670 may be configured to both transmit and receive cellular network signals, wireless data signals, or other types of signals via the antenna 1690, depending on the nature of the mobile device 1600. Further, in some configurations, a GPS receiver 1680 may also make use of the antenna 1690 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 17:
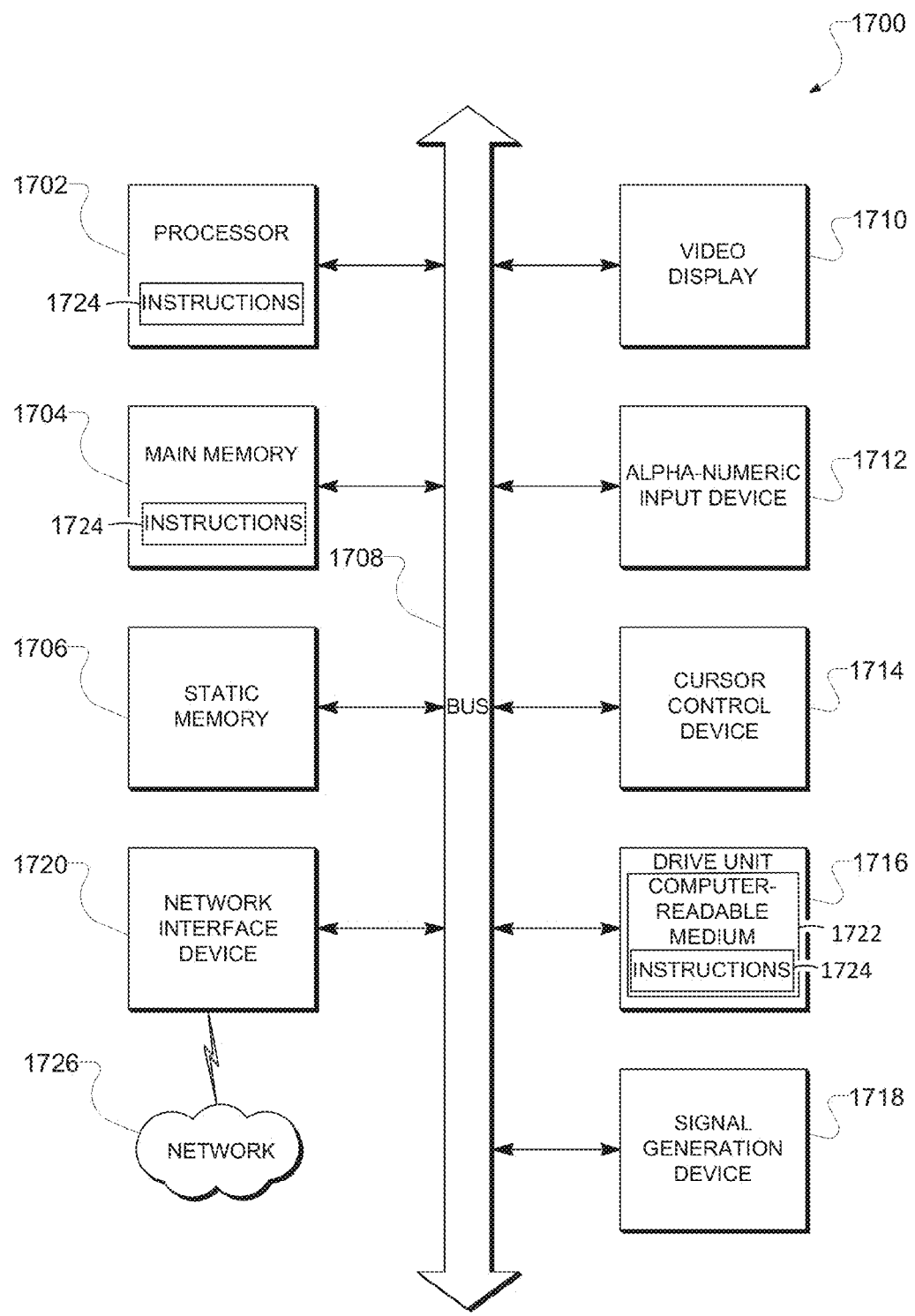
FIG. 17 is a diagrammatic representation of a machine in the example form of a computer system within which a set of instructions, for causing the machine to perform any one or more of the methodologies discussed herein, may be executed.

FIG. 17 is a block diagram of machine in the example form of a computer system 1700 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1700 includes a processor 1702 (e.g., a central processing unit (CPU), a graphics processing unit (GPU) or both), a main memory 1704 and a static memory 1706, which communicate with each other via a bus 1708. The computer system 1700 may further include a video display unit 1710 (e.g., a liquid crystal display (LCD) or a cathode ray tube (CRT)). The computer system 1700 also includes an alphanumeric input device 1712 (e.g., a keyboard or a touch-sensitive display screen), a user interface (UI) navigation device 1714 (e.g., a mouse), a disk drive unit 1716, a signal generation device 1718 (e.g., a speaker) and a network interface device 1720.

Machine-Readable Medium

The disk drive unit 1716 includes a machine-readable medium 1722 on which is stored one or more sets of instructions and data structures (e.g., software) 1724 embodying or utilized by any one or more of the methodologies or functions described herein. The instructions 1724 may also reside, completely or at least partially, within the main memory 1704 and/or within the processor 1702 during execution thereof by the computer system 1700, the main memory 1704 and the processor 1702 also constituting machine-readable media.

While the machine-readable medium 1722 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1724 may further be transmitted or received over a communications network 1726 using a transmission medium. The instructions 1724 may be transmitted using the network interface device 1720 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
   accessing at least one of an item listing title associated with an item listing of an e-commerce website and a user search query associated with an item search request submitted to the e-commerce website;

converting words in the listing title or user search query to semantic tokens in a token symbol space, based on a tokenizing process;

determining, using one or more processors, that one or more of the tokens are attribute values associated with predefined attributes of one or more product categories in a product category structure of the e-commerce website;

classifying, using the one or more processors, remaining ones of the tokens as candidate product type tokens associated with a global product taxonomy;

identifying frequent terms in leaf categories associated with the product category structure of the e-commerce website;

determining an entropy value of each of the candidate product type tokens based on the frequent terms in the leaf categories; and ranking each of the candidate product type tokens, based on the entropy value associated with each of the candidate product type tokens.

2. The method of claim 1, further comprising:
determining that the remaining ones of the tokens corresponds to a single candidate product type token;
determining that the single candidate product type token is a product type in the global product taxonomy; and
incorporating the product type into the global product taxonomy.

3. The method of claim 1, wherein candidate product type tokens having a smaller entropy value are ranked higher than product type tokens having a greater entropy value.

4. The method of claim 1, further comprising:
classifying the highest ranked candidate product type token as a product type in the global product taxonomy; and
incorporating the product type into the global product taxonomy.

5. The method of claim 1, further comprising:
identifying a group of the highest ranked candidate product type tokens;
displaying, via a user interface, the group of the highest ranked candidate product type tokens;
receiving, via the user interface, a user specification of one of the displayed candidate product type tokens;
classifying the user specified candidate product type token as a product type in the global product taxonomy; and
incorporating the product type token into the global product taxonomy.

6. The method of claim 1, further comprising:
generating mapping information mapping a product type in the global product taxonomy to the particular product category in the product category structure of the e-commerce website.

7. The method of claim 6, further comprising:
receiving, via a user interface, the item listing title in connection with a user request to post an item listing on the e-commerce website;
determining a product type in the global product taxonomy, based on the item listing title;
determining, based on the mapping information, one or more product categories in the product category structure of the e-commerce website associated with the product type; and
notifying the user that the item listing title is associated with the one or more product categories in the product category structure of the e-commerce website.

8. An apparatus comprising:
a tokenization module configured to:
access at least one of an item listing title associated with an item listing of an e-commerce website and a user search query associated with an item search request submitted to the e-commerce website; and
convert words in the listing title or user search query to semantic tokens in a token symbol space, based on a tokenizing process; and
a determination module implemented by one or more processors and configured to:
determine that one or more of the tokens are attribute values associated with predefined attributes of one or more product categories in a product category structure of the e-commerce website;
classify remaining ones of the tokens as candidate product type tokens associated with a global product taxonomy;
identify frequent terms in leaf categories associated with the product category structure of the e-commerce website;
determine an entropy value of each of the candidate product type tokens based on the frequent terms in the leaf categories; and
rank each of the candidate product type tokens, based on the entropy value associated with each of the candidate product type tokens.

9. The apparatus of claim 8, wherein the determination module is further configured to:
determine that the remaining ones of the tokens corresponds to a single candidate product type token;
determine that the single candidate product type token is a product type in the global product taxonomy; and
incorporate the product type into the global product taxonomy.

10. The apparatus of claim 8, wherein candidate product type tokens having a smaller entropy value are ranked higher than product type tokens having a greater entropy value.

11. The apparatus of claim 8, wherein the determination module is further configured to:
classify the highest ranked candidate product type token as a product type in the global product taxonomy; and
incorporate the product type into the global product taxonomy.

12. The apparatus of claim 8, wherein the determination module is further configured to:
identify a group of the highest ranked candidate product type tokens;
display, via a user interface, the group of the highest ranked candidate product type tokens;
receive, via the user interface, a user specification of one of the displayed candidate product type tokens;
classify the user specified candidate product type token as a product type in the global product taxonomy; and
incorporate the product type token into the global product taxonomy.

13. The apparatus of claim 8, wherein the determination module is further configured to:
generate mapping information mapping a product type in the global product taxonomy to the particular product category in the product category structure of the e-commerce website.

14. The apparatus of claim 13, wherein the determination module is further configured to:
receive, via a user interface, the item listing title in connection with a user request to post an item listing on the e-commerce website;
determine a product type in the global product taxonomy, based on the item listing title;

determine, based on the mapping information, one or more product categories in the product category structure of the e-commerce website associated with the product type; and notify the user that the item listing title is associated with the one or more product categories in the product category structure of the e-commerce website.

15. A non-transitory machine-readable storage medium having embodied thereon instructions executable by one or more machines to perform operations comprising:

accessing at least one of an item listing title associated with an item listing of an e-commerce website and a user search query associated with an item search request submitted to the e-commerce website;

converting words in the listing title or user search query to semantic tokens in a token symbol space, based on a tokenizing process;

determining that one or more of the tokens are attribute values associated with predefined attributes of one or more product categories in a product category structure of the e-commerce website;

classifying remaining ones of the tokens as candidate product type tokens associated with a global product taxonomy;

identifying frequent terms in leaf categories associated with the product category structure of the e-commerce website;

determining an entropy value of each of the candidate product type tokens based on the frequent terms in the leaf categories; and ranking each of the candidate product type tokens, based on the entropy value associated with each of the candidate product type tokens.

16. The storage medium of claim 15, wherein candidate product type tokens having a smaller entropy value are ranked higher than product type tokens having a greater entropy value.

17. The storage medium of claim 15, wherein the operations further comprise:

classifying the highest ranked candidate product type token as a product type in the global product taxonomy; and incorporating the product type into the global product taxonomy.

* * * * *